United States Patent
Tsunematsu

(10) Patent No.: US 8,401,325 B2
(45) Date of Patent: Mar. 19, 2013

(54) IMAGE PROCESSING METHOD, IMAGE PROCESSING APPARATUS, AND COMPUTER PROGRAM FOR CORE LINE MODIFICATION OF A THINNING FIGURE IN AN IMAGE PROCESS

(75) Inventor: Yuuichi Tsunematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 12/637,594

(22) Filed: Dec. 14, 2009

(65) Prior Publication Data
US 2010/0172595 A1    Jul. 8, 2010

(30) Foreign Application Priority Data
Jan. 5, 2009  (JP) .................................. 2009-000388

(51) Int. Cl.
*G06K 9/42* (2006.01)
(52) U.S. Cl. ........ 382/258; 382/197; 382/204; 382/253; 382/256; 382/259
(58) Field of Classification Search .................. 382/100, 382/193, 197, 198, 204, 253, 256–259, 288
See application file for complete search history.

(56) References Cited

U.S. PATENT DOCUMENTS

| | | | | |
|---|---|---|---|---|
| 4,368,462 A | * | 1/1983 | Crawley | 382/316 |
| 4,922,332 A | * | 5/1990 | Taniguchi et al. | 382/258 |
| 5,050,229 A | * | 9/1991 | Barski et al. | 382/259 |
| 5,710,837 A | | 1/1998 | Matsumoto et al. | |
| 7,630,572 B2 | * | 12/2009 | Ashikaga | 382/254 |
| 2005/0063596 A1 | * | 3/2005 | Yomdin et al. | 382/232 |

FOREIGN PATENT DOCUMENTS
JP   5-094525 A   4/1993

OTHER PUBLICATIONS

Shokodo, "Fundamentals of C-based image processing" first edition, ISBN4-7856-3124-4, Nov. 20, 2000, pp. 53-58.
Shokodo, "Digital image processing for image understanding (II)", first edition, ISBN4-7856-2004-8, Apr. 30, 1988, pp. 32-37.

\* cited by examiner

*Primary Examiner* — Eric Rush
(74) *Attorney, Agent, or Firm* — Fitzpatrick, Cella, Harper & Scinto

(57) ABSTRACT

According to one aspect of the present invention, there is provided an image processing apparatus comprising: a thinning process unit which extracts a core line by applying a thinning process; a line width estimation unit which estimates an original line width of each pixel of the core line; a core line division unit which divides the core line; a monospaced line determination unit which determines, based on line width information, whether or not each of core lines divided by the core line division unit is a monospaced line; a connection relation information generation unit which generates connection relation information with another core line in association with each of the core lines; and a core line modification unit which modifies the core lines, based on pieces of line width information of core line pixels, a monospaced line determination result, and pieces of connection relation information generated.

10 Claims, 14 Drawing Sheets

FIG. 7
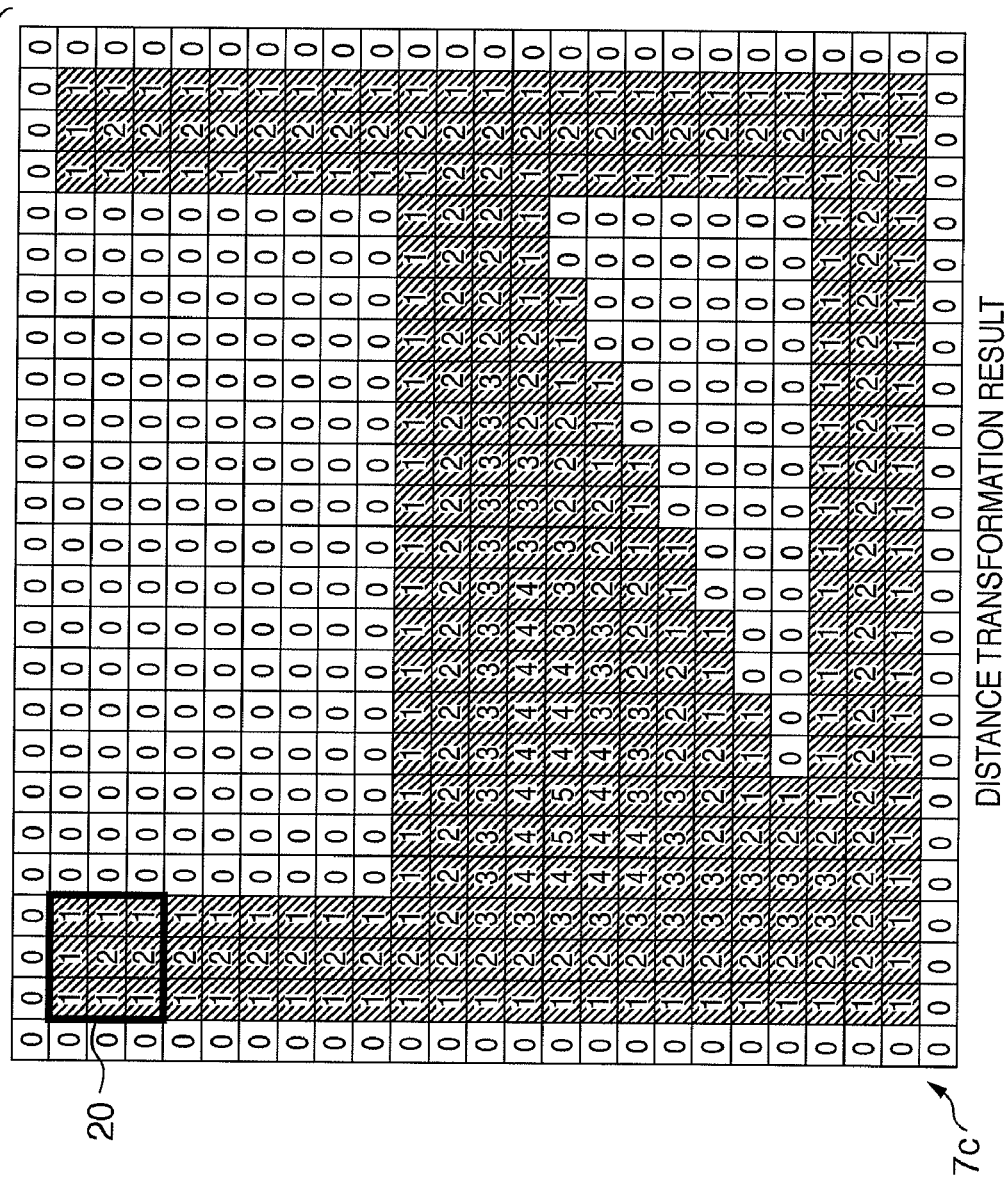
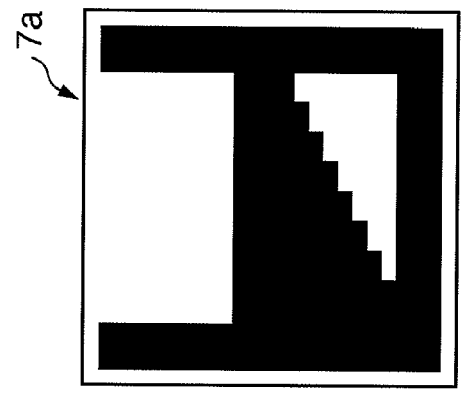
INPUT IMAGE
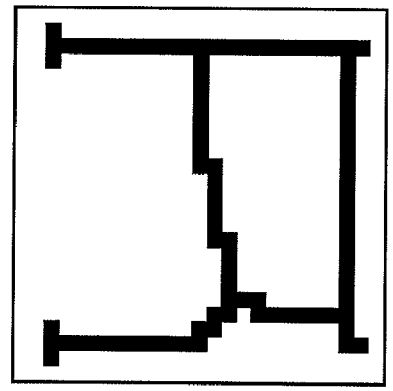
THINNING RESULT
DISTANCE TRANSFORMATION RESULT

LINE WIDTH ESTIMATION RESULT

FIG. 10

| INTERSECTION NUMBER | CONNECTION INTERVAL | | |
|---|---|---|---|
| a | INTERVAL ac | INTERVAL ag | INTERVAL ah |
| b | INTERVAL bd (MONOSPACED LINE) | INTERVAL bi | INTERVAL bj |
| c | INTERVAL ac | INTERVAL cd | INTERVAL ce |
| d | INTERVAL bd (MONOSPACED LINE) | INTERVAL cd | INTERVAL df (MONOSPACED LINE) |
| e | INTERVAL ce | INTERVAL ef (MONOSPACED LINE) | INTERVAL ek |
| f | INTERVAL df (MONOSPACED LINE) | INTERVAL ef (MONOSPACED LINE) | INTERVAL fl |

'butt' cap     'round' cap     'square' cap

FIG. 15

| INTERSECTION / END POINT NUMBER | CONNECTION INTERVAL | | |
|---|---|---|---|
| a | INTERVAL ac (MONOSPACED LINE) | | |
| b | INTERVAL be (MONOSPACED LINE) | | |
| c | INTERVAL ac (MONOSPACED LINE) | INTERVAL cd | |
| d | INTERVAL cd | INTERVAL de | INTERVAL dg |
| e | INTERVAL be (MONOSPACED LINE) | INTERVAL de | INTERVAL eg (MONOSPACED LINE) |
| f | INTERVAL fg | | |
| g | INTERVAL fg | INTERVAL eg (MONOSPACED LINE) | |

IMAGE PROCESSING METHOD, IMAGE PROCESSING APPARATUS, AND COMPUTER PROGRAM FOR CORE LINE MODIFICATION OF A THINNING FIGURE IN AN IMAGE PROCESS

BACKGROUND OF THE INVENTION

1. Field of the Invention

The present invention relates to an image processing method, image processing apparatus, and program and, more particularly, to a core line modification method of a thinning figure in an image process.

2. Description of the Related Art

A thinning process is a process for converting an input binary image so that each figure pixel has a 1-pixel width. According to the thinning process, unlike a shrinkage process which simply deletes figure pixels (black pixels) that contact background pixels (white pixels), a core line that represents the center line of a line part of a figure can be extracted while holding the topology (positional relation/connection relation) of the figure. The thinning processing is an image process method which is popularly used as a pre-process of character recognition, pattern recognition, and vectorization. The thinning process has been studied through the ages, and various methods have been proposed. Of these methods, a Hilditch thinning method is prevalent as a known thinning method (for example, see Agui & Nagao, "Fundamentals of C-based image processing", first edition, ISBN4-7856-3124-4, Shokodo, published on Nov. 20, 2000, pp. 53-58).

In the Hilditch thinning method, using a 3×3 window, which refers to a pixel of interest and eight pixels around the pixel of interest, as a basic process unit, the entire image data is raster-scanned to process each pixel as a pixel of interest, thus attaining a thinning process. When a certain pixel is selected as a pixel of interest, it is determined if that pixel meets thinning deletion conditions which are defined in advance for each 3×3 window. If the pixel of interest meets the deletion conditions, a process for deleting the pixel of interest, that is, replacing a figure pixel by a background pixel is executed. On the other hand, if the pixel of interest does not meet the deletion conditions, the next pixel in the raster scan order is selected as a pixel of interest, and the same process is executed for a new 3×3 window. This process is repeated for all pixels of the image data. Then, a series of processes in the raster scan are repeated until all pixels to be deleted are removed in a single raster scan. When all pixels to be deleted are removed in the single raster scan, the thinning process is completed. FIG. 3 shows an example of the process result of the Hilditch thinning method. 3a in FIG. 3 shows an original image, and 3b in FIG. 3 shows the result of the thinning process based on the Hilditch thinning method. 3c in FIG. 3 is a view showing an image obtained by overlapping the original image and the thinning processed image. As can be seen from 3c in FIG. 3, the thinning processed image becomes nearly a core line image of the original image.

In the thinning process, since the topology of a figure of the original image has to be held, the deletion conditions have to include a constraint "when a line width to be processed reaches one pixel, no more deletion is made". However, in the Hilditch thinning method, whether or not to delete a certain pixel of interest is determined with reference to only eight neighboring pixels around the pixel of interest. For example, since a 3×3 window (i) in 3c in FIG. 3 includes pixels of a corner portion of a broken line, it is desired to delete the pixel of interest in the 3×3 window (i) so as to express the broken line by a single core line without any branch. On the other hand, since a 3×3 window (ii) includes pixels of an end portion of a line image, it is desired not to delete the pixel of interest since the length of a line of the original image is different from that of a line of the core line if that pixel is deleted. However, in only a layout of pixels in a 3×3 window, since only eight neighboring pixels around the pixel of interest are referred to, whether or not to delete the pixel of interest cannot be adaptively determined. For this reason, if the thinning conditions are set not to delete a central pixel (pixel of interest) of the window (ii), a pixel to be deleted unwantedly remains at the edge of a straight line or a corner like in the window (i). Hence, a thinning method which determines whether or not to delete a pixel with reference to a range broader than eight neighboring pixels around a pixel of interest has been proposed. However, a thinning method which can practically be free from any remaining pixels to be deleted has never been proposed. The remaining pixels to be deleted are also called a branch line noise, and a core line has to be used after this branch line noise of the thinning result is removed.

FIG. 4 shows an example obtained when a thinning process based on the pixel layout in a 3×3 window is applied to an image including solid regions (plane portions), shown in 4a in FIG. 4, as in FIG. 3. When the thinning process is applied to an image including solid regions, an image obtained by deleting each plane to be an oblique line is obtained as the process result. The oblique line observed in the thinning result of the plane portion is not a branch line noise as a result of thinning but it can be considered as a core line that expresses the feature of a plane region. Hence, in order to use the oblique line obtained by processing the plane as a core line that expresses a plane portion in a post-process, this oblique line is a core line component which is not to be removed as a branch line noise.

In 4b in FIG. 4, when the core line of the thinning result is separated for respective intersections, in an interval ab (an interval from an intersection a to an intersection b via an upper left corner of 4c in FIG. 4) which connects the intersections a and b in 4c in FIG. 4, a core line which expresses a monospaced line (a core line generated by applying a thinning process to a portion of a line having a constant line width) and a core line which expresses the plane (a core line generated by applying a thinning process to the plane portion) are unwantedly mixed. That is, in the post-process after thinning, even when the core line of the monospaced line portion and that of a non-monospaced line portion (plane portion) have to be separately handled, if the type of each line is determined for each unit divided based on intersections, the plane and a monospaced line cannot be appropriately separated.

On the other hand, as a method of removing each branch line noise from a thinning image, a method of detecting the branch point and end point of a core line, and extracting and deleting figure pixels which include the end point and have a length equal to or smaller than a predetermined value is available (for example, see Japanese Patent Laid-Open No. 5-94525). With this technique, a branch line noise having a predetermined length or less can be deleted from the thinning image.

Also, a technique called distance transformation is known. The distance transformation is a process for replacing values of figure pixels in a binary image by distance values from background pixels. By executing the distance transformation, a distance from each figure pixel to the nearest background pixel can be calculated. (For example, see Junichiro Toriwaki, "Digital image processing for image understanding (II)", first edition, ISBN4-7856-2004-8, Shokodo, published on Apr. 30, 1988, pp. 32-37, etc.)

SUMMARY OF THE INVENTION

However, when only the length of a branch line noise is used as a criterion of judgment, a long branch line noise may be left without being deleted, or a core line generated upon thinning a plane portion may be faultily deleted as a branch line noise.

When a core line which expresses a monospaced line and that which expresses a non-monospaced line are mixed (e.g., 4c in FIG. 4), it is impossible for the technique of the above reference to separate them.

The present invention has been made in consideration of the related arts, and provides to solve the aforementioned problems. More specifically, the present invention provides to provide an image processing apparatus and image processing method, and a program, which modify branch line noises and distortions of core lines, which are included in a thinning image obtained by thinning an image, and do not express the feature of an original image, based on original line width information estimated for core line pixels, and connection relation information between core lines, and can generate a core line image which faithfully expresses the feature of the original image.

According to one aspect of the present invention, there is provided an image processing apparatus comprising: a thinning process unit which extracts a core line by applying a thinning process to an input image; a line width estimation unit which estimates an original line width of each pixel of the core line extracted by the thinning process unit; a core line division unit which divides the core line extracted by the thinning process unit at an intersection; a monospaced line determination unit which determines, based on line width information estimated by the line width estimation unit, whether or not each of core lines divided by the core line division unit is a monospaced line; a connection relation information generation unit which generates connection relation information with another core line in association with each of the core lines divided by the core line division unit; and a core line modification unit which modifies the core lines divided by the core line division unit, based on pieces of line width information of core line pixels estimated by the line width estimation unit, a monospaced line determination result by the monospaced line determination unit, and pieces of connection relation information generated by the connection relation information generation unit.

According to the present invention, branch line noises and distortions of core lines, which are generated in the thinning process and do not express the feature of an image, are precisely modified, and monospaced line and non-monospaced line components can be separately obtained with high precision. Then, a thinning image which is easy to use in a post-process can be obtained. This leads to, for example, improvement of original image reproducibility, enhancement of editability, and a data size reduction of vector data obtained by a vectorization process when the vectorization process is executed as a post-process after thinning.

Further features of the present invention will become apparent from the following description of exemplary embodiments (with reference to the attached drawings).

BRIEF DESCRIPTION OF THE DRAWINGS

FIG. 7 is a view showing process examples of a thinning process and distance transformation process;

FIG. 10 is a table showing a holding example of connection relation information;

FIG. 15 is a table showing a holding example of connection relation information obtained after the core line modification process.

DESCRIPTION OF THE EMBODIMENTS

<First Embodiment>

An embodiment of the present invention will be described hereinafter with reference to the accompanying drawings.

<Arrangement of Image Processing Apparatus>

An example of the arrangement of an image processing apparatus according to this embodiment will be described below with reference to the block diagram of FIG. 2. An image processing apparatus shown in FIG. 2 can be, for example, a general-purpose computer to which a scanner is connected, or a digital copying machine. Even in case of the digital copying machine, since a printer is not an indispensable element in this embodiment, a description thereof will not be given.

Figure 2:
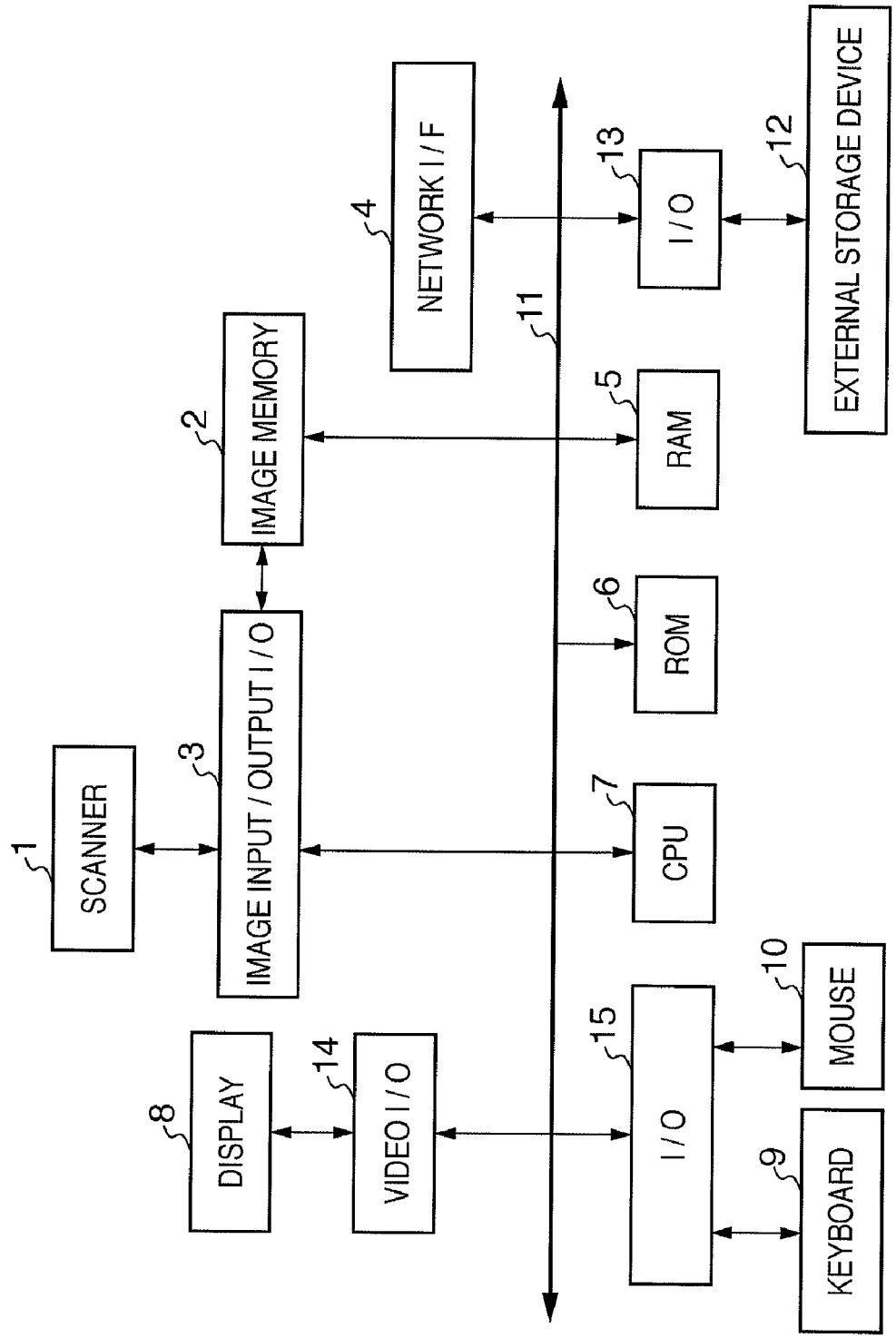
FIG. 2 is a block diagram showing the arrangement of the information processing apparatus according to the embodiment.
Figure 3:
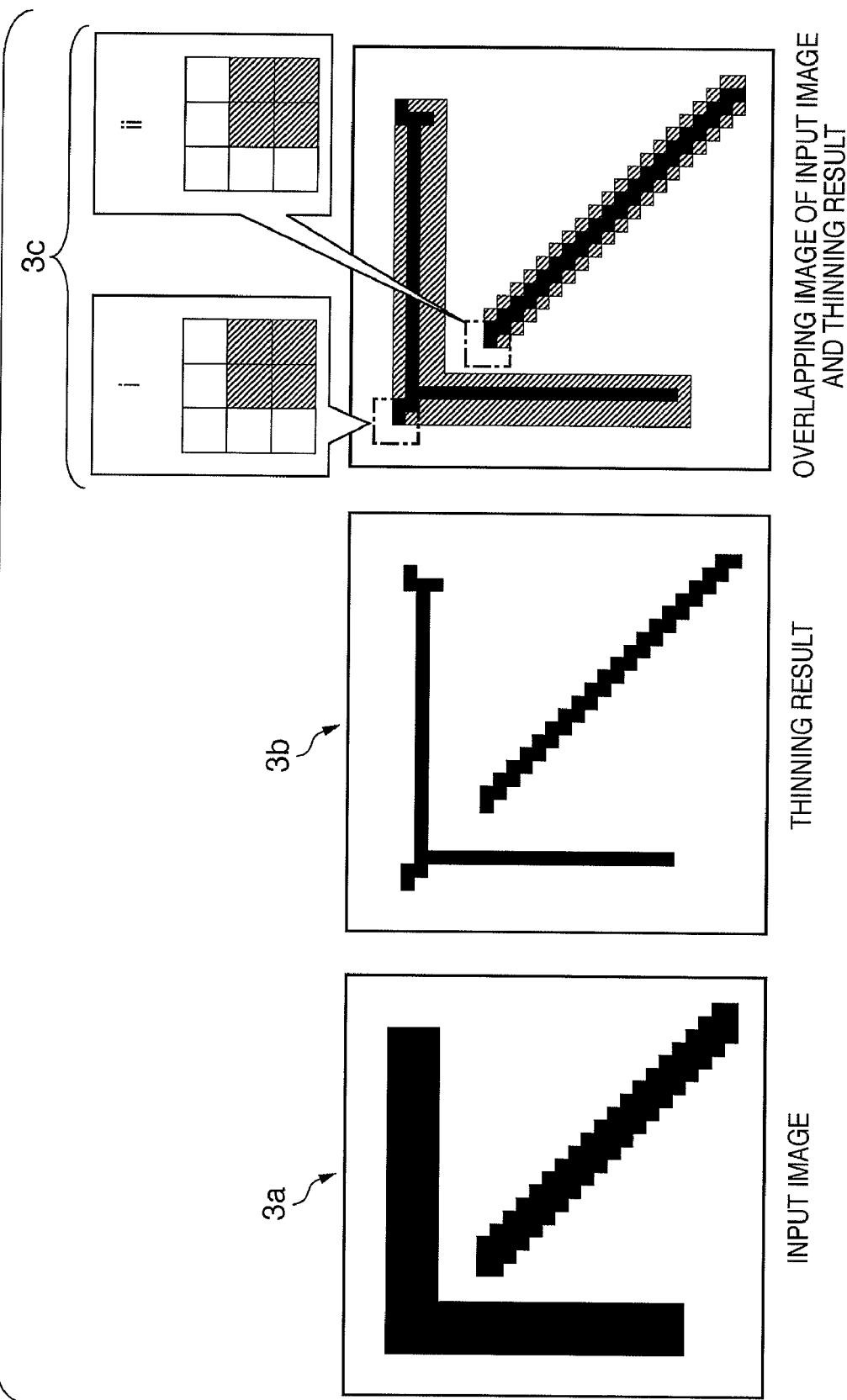
FIG. 3 is a view showing the process result of the Hilditch thinning method.
Figure 4:
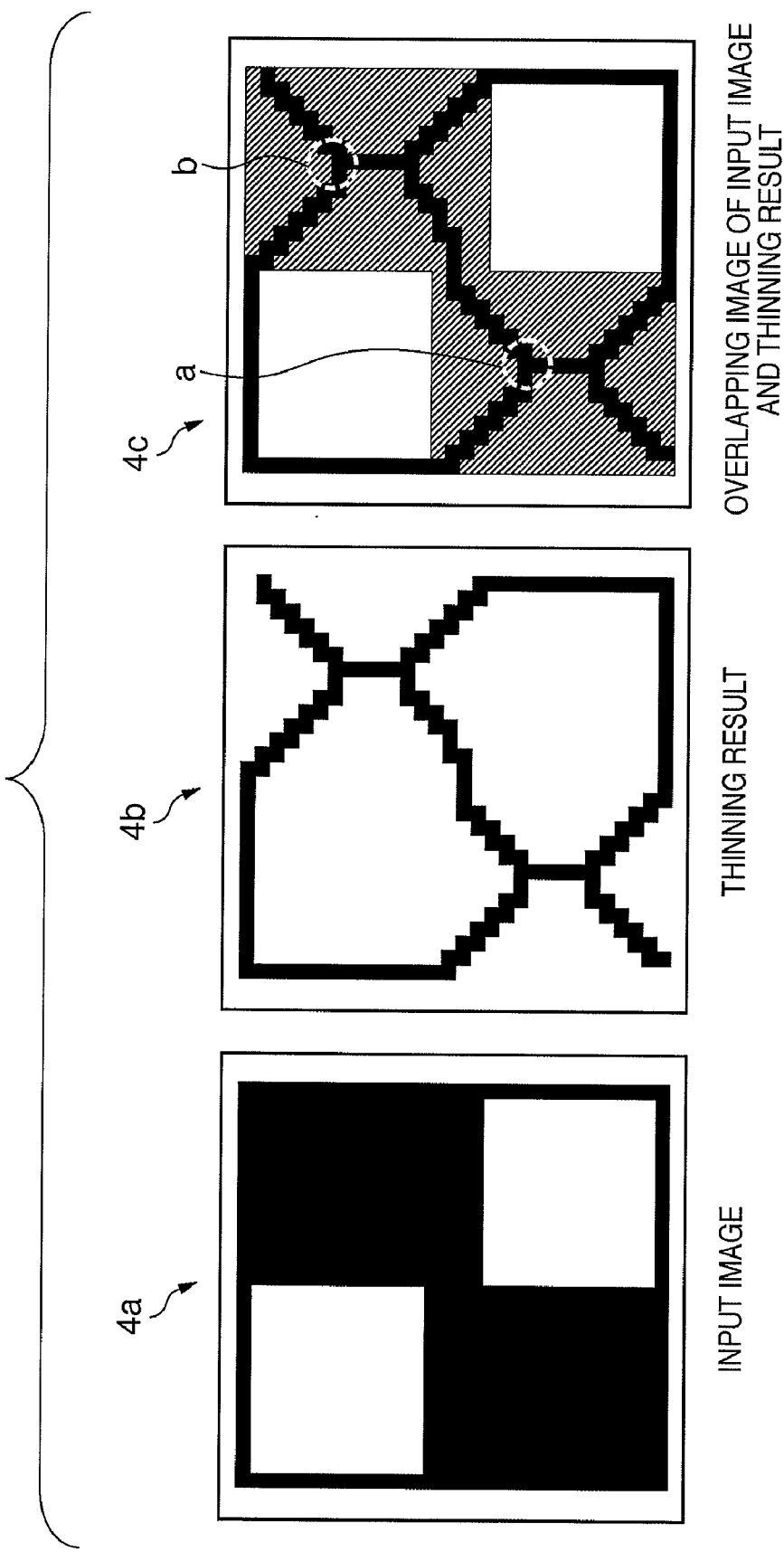
FIG. 4 is a view showing the process result of an image including plane regions by the Hilditch thinning method.

Referring to FIG. 2, a central processing unit (CPU) 7 controls the overall apparatus. A read only memory (ROM) 6 stores programs and parameters which need not be changed. A random access memory (RAM) 5 temporarily stores programs and data, which are supplied from an external apparatus and the like. A scanner 1 is a device used to optically scan, for example, a document and to obtain electronic image data. An image input/output interface (I/O) 3 is an interface which connects the scanner 1 and the image processing apparatus. An image memory 2 is a memory used to hold image data and the like scanned by the scanner 1. An external storage device 12 is a storage used to store files, and includes a hard disk, a memory card, a removable optical disk such as a flexible disk (FD) or compact disk (CD), a magnetic or optical card, or an IC card. An interface (I/O) 13 is an input/output interface between the external storage device 12 and a computer apparatus. An interface (I/O) 15 is an interface with input devices such as a pointing device 10 (e.g., a mouse) and keyboard 9 which accept user's operations and input data. A video interface (I/O) 14 is an interface with a display monitor 8 which displays data held by the image processing apparatus and supplied data. A network interface (I/F) 4 is a network interface used to connect to a network line such as the Internet. A system bus 11 has a function of allowing the respective units 1 to 15 to communicate with each other.

<Thinning Process of Image>

The processing sequence which implements the present invention by programs executed on the CPU 7 will be described below with reference to the flowchart of FIG. 1.

Figure 1:
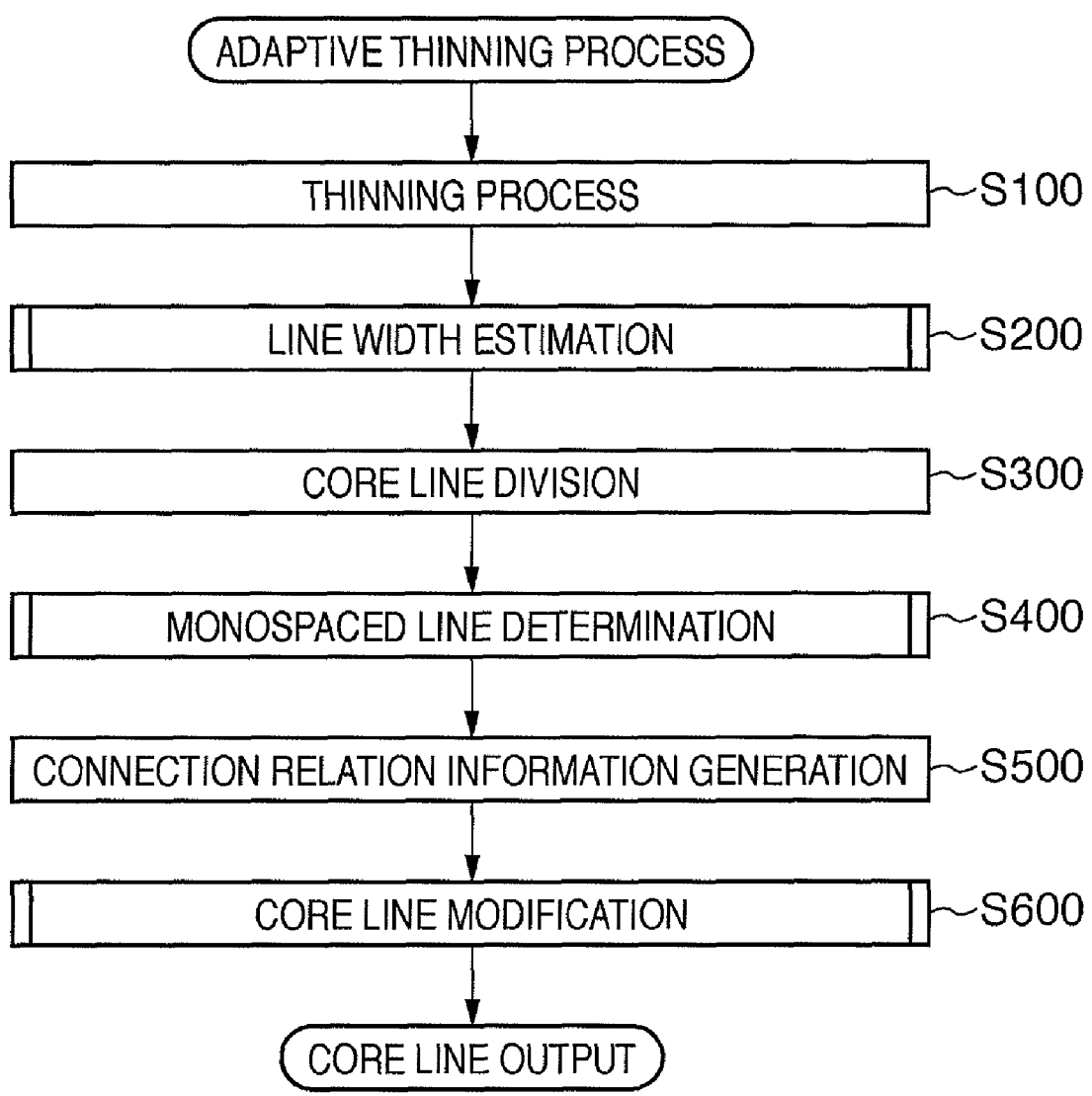
FIG. 1 is a flowchart showing the main process of an information processing apparatus according to an embodiment.

FIG. 1 is a flowchart showing the overall sequence of operations in the apparatus which carries out the invention according to the present application. When an image process starts, image data including an image region to be processed is input. As for image input, image data scanned by the scanner 1 is input to the image memory 2 via the image input/output I/O 3. Alternatively, the image including the image region to be processed may be input from an external apparatus via the network I/F 4, or image data pre-stored in the external storage device 12 may be loaded via the I/O 13. The obtained input image is held on the image memory 2. This image data is to be processed in FIG. 1.

Referring to FIG. 1, the input image data is converted into binary image data, which undergoes a thinning process in step S100. When the image data to be processed is multi-valued image data, a binarization process is executed using a threshold held in advance on the ROM 6 to convert that image data into binary image data. In case of color image data, a color reduction process, clustering process, and the like may be executed to convert input image data into image data defined by representative colors fewer than the original image data, and the image data including color components of the representative colors may be converted into binary image data to be processed. Note that when the image data to be processed is already binary image data, the control directly advances to the next process.

An operator may instruct to input the threshold on the ROM 6, which is used in the binarization process, the color reduction process, and the like, using the input device such as the keyboard 9 or mouse 10 via the I/O 15 while visually observing the input image data displayed on the display monitor 8 via the video I/O 14. Note that the binarization process is not limited to the aforementioned method, and a known binarization process such as a process for binarizing image data by adaptively changing thresholds according to images may be used. In this embodiment, the thinning algorithm adopts the Hilditch thinning method referred to above. By executing this thinning process, a core line image is obtained.

<Line Width Estimation Process>

Figure 5:
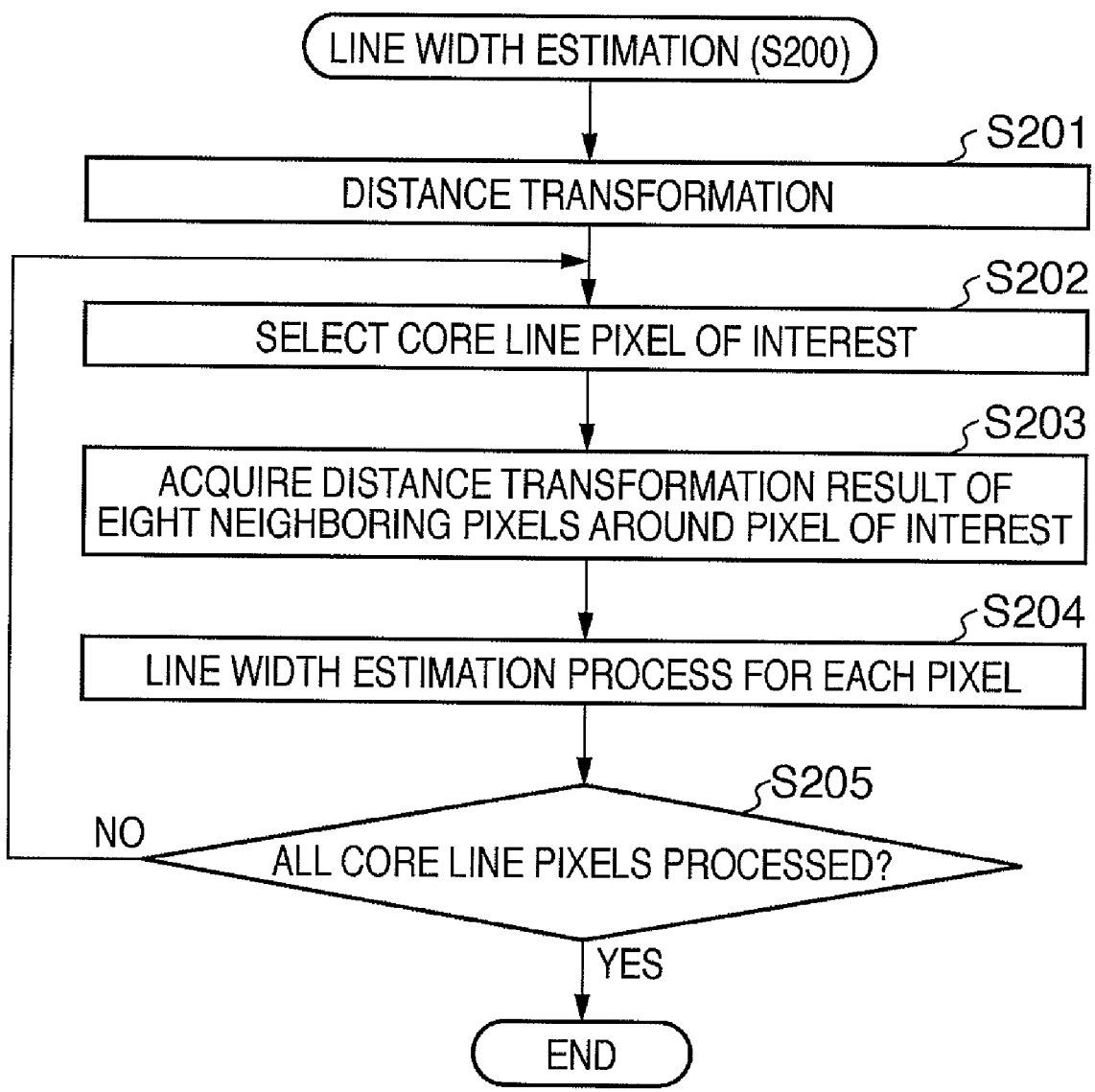
FIG. 5 is a flowchart showing a line width estimation process.
Figure 6:
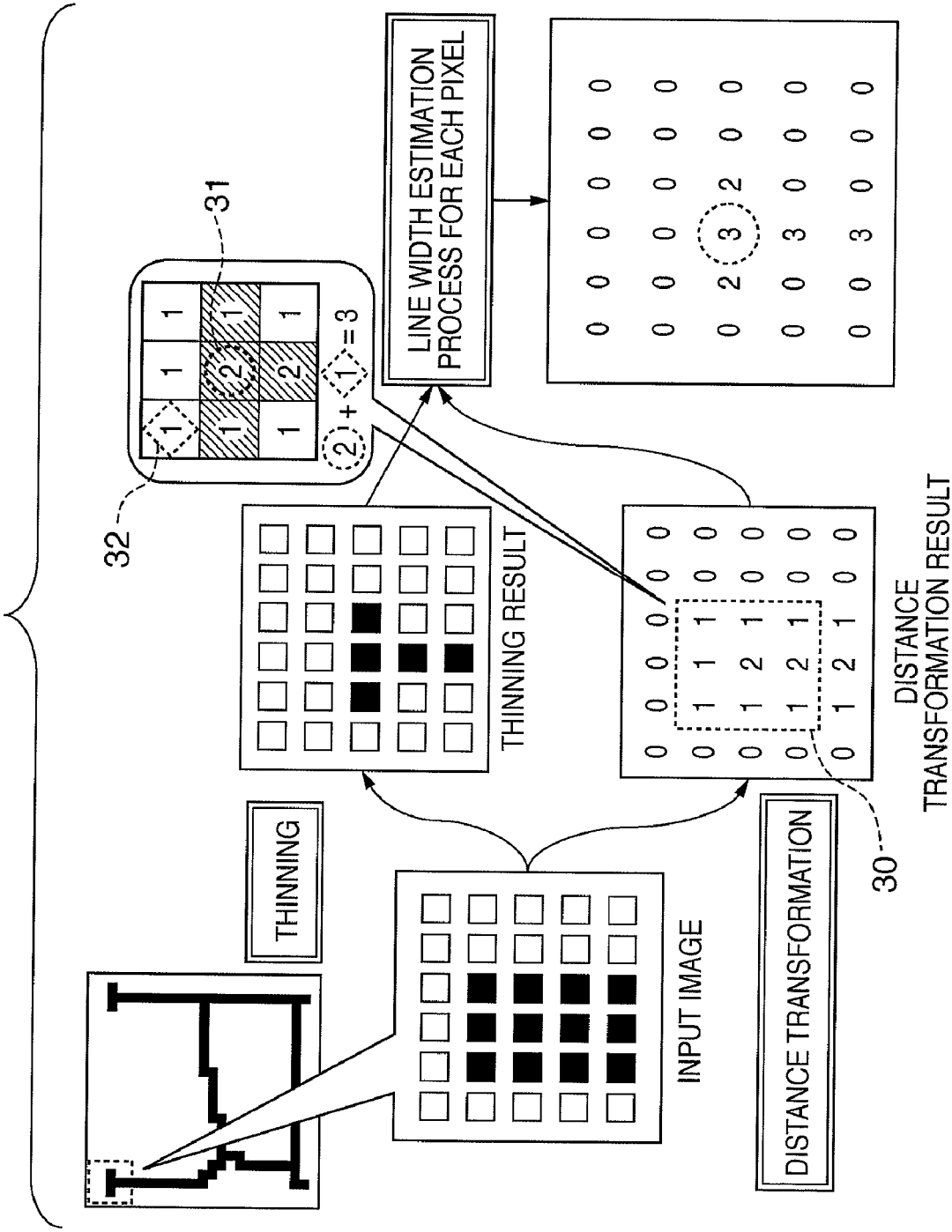
FIG. 6 is an explanatory view of the line width estimation process.

In step S200, a line width estimation process is executed for the image data that has undergone the thinning process. This process estimates line widths on an original image corresponding to core line pixels obtained in step S100. FIGS. 5 and 6 show details of the process in step S200.

In step S201, distance transformation is applied to the binary image obtained as the input image. An image obtained as the distance transformation result is an image obtained by setting a distance from each figure pixel of interest to the nearest background pixel as a distance value in each pixel. At this time, in each background pixel, a distance value is zero. FIG. 7 shows an execution example of a practical distance transformation result. 7c in FIG. 7 shows the application result of the distance transformation process to 7a in FIG. 7. 7c in FIG. 7 shows numerical values that represent distance values set in respective pixels in an image of the distance transformation result.

One core line pixel is selected as a pixel of interest in step S202, and a 3×3 window including that pixel of interest and eight neighboring pixels around the pixel of interest is set to acquire values corresponding to the window position from the distance transformation result calculated in step S201, in step S203. For example, a core line image obtained as the thinning result of 7a in FIG. 7 is, as shown in 7b in FIG. 7. Then, when an intersection on a core line located at the uppermost left position in 7b in FIG. 7 is exemplified as a pixel of interest, since a 3×3 frame 20 in 7c in FIG. 7 (a frame 30 in FIG. 6) corresponds to the position of the 3×3 window, distance values inside the window are acquired.

In step S204, a process for estimating a value of a corresponding line width (to be referred to as a line width value hereinafter) in an original image is applied to the core line pixel selected in step S202 using the values of the distance transformation result corresponding to the 3×3 window obtained in step S203. Of the eight neighboring pixels around the pixel of interest, a maximum value of the distance transformation result which is located at a non-core line pixel position is added to the distance transformation result value corresponding to the pixel of interest selected in step S202, thus estimating the line width value. For example, in the 3×3 window 30 in FIG. 6, a distance value corresponding a pixel of interest 31 is "2", and a maximum distance value at a non-core line pixel position in the window is "1", as denoted by reference numeral 32. Hence, the maximum distance value "1" of the pixel which is not the non-core line pixel is added to the distance value "2" of the distance transformation result of the pixel of interest to yield "3" as an estimated line width of the pixel of interest.

Figure 8:
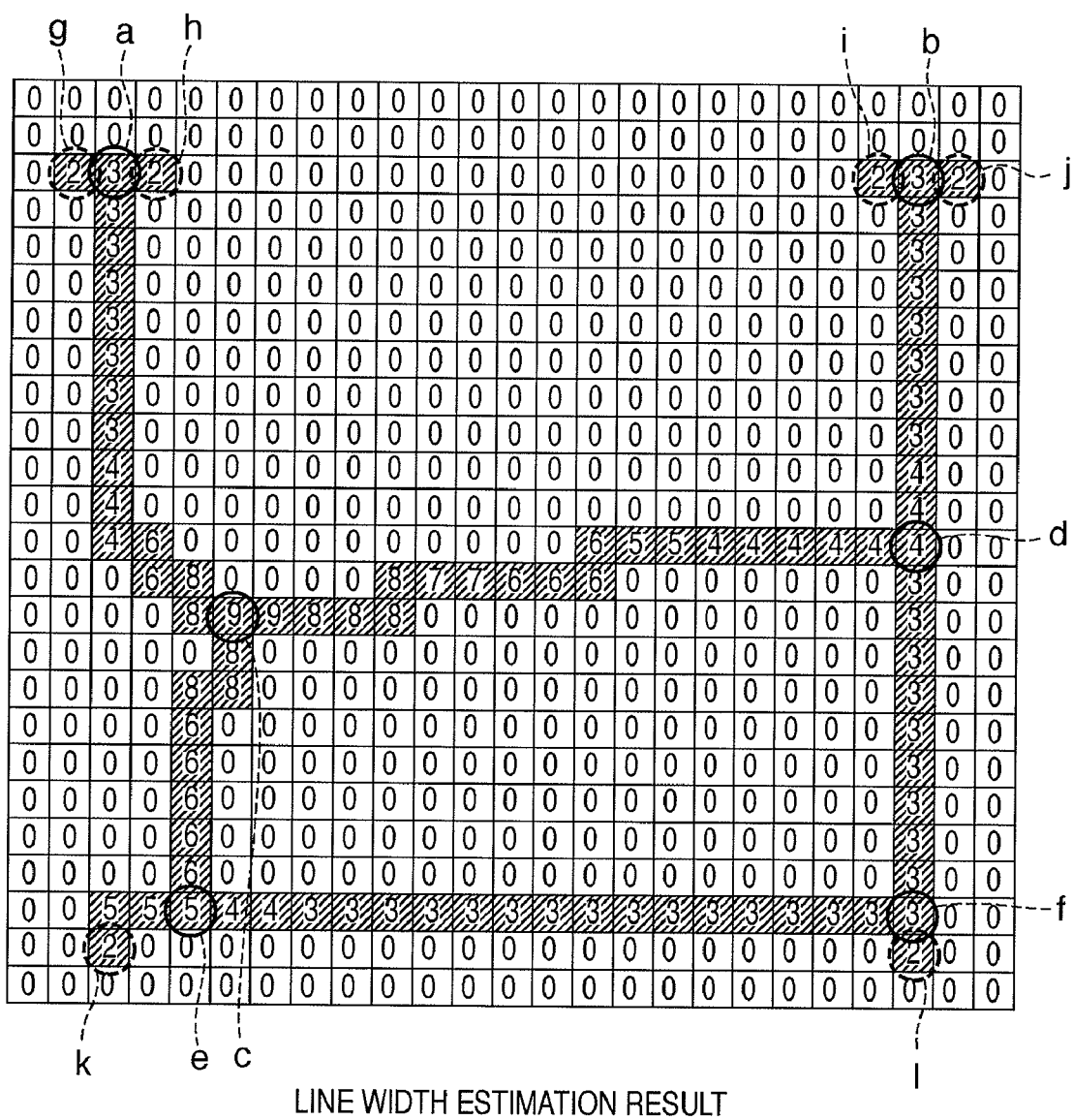
FIG. 8 is a view showing a process example of the line width estimation process.

It is determined in step S205 if the line width estimation process is complete for all the core line pixels. If pixels to be processed still remain, the process returns to step S202 to select the next pixel and to continue the line width estimation process. If all the pixels have been processed, the line width estimation process ends, and the control advances to the next process. FIG. 8 shows numerical values which represent the application result of the line width estimation process with reference to 7b and 7c in FIG. 7 to the binary image shown in 7a in FIG. 7.

As described above, the line width estimation process is a process for estimating the line width of each core line image based on the distance values in each image calculated by the distance transformation.

<Core Line Division Process>

In step S300, a process for dividing the core line obtained in step S100 at intersections is executed so as to allow handling of core lines for respective intervals between intersections and end points in the subsequent processes. FIG. 8 includes intersections a to f, and end points g to l. At this time, the core line is divided based on the positions of the intersections and end points like an interval from a to g, that from a to c, that from a to h, and that from b to i (to be referred to as divided core lines hereinafter). Also, the "interval from a to g" will be referred to as an "interval ag" hereinafter. Each interval can be specified by the coordinates of pixels on, for example, raster data.

<Monospaced Line Determination Process>

Figure 9:
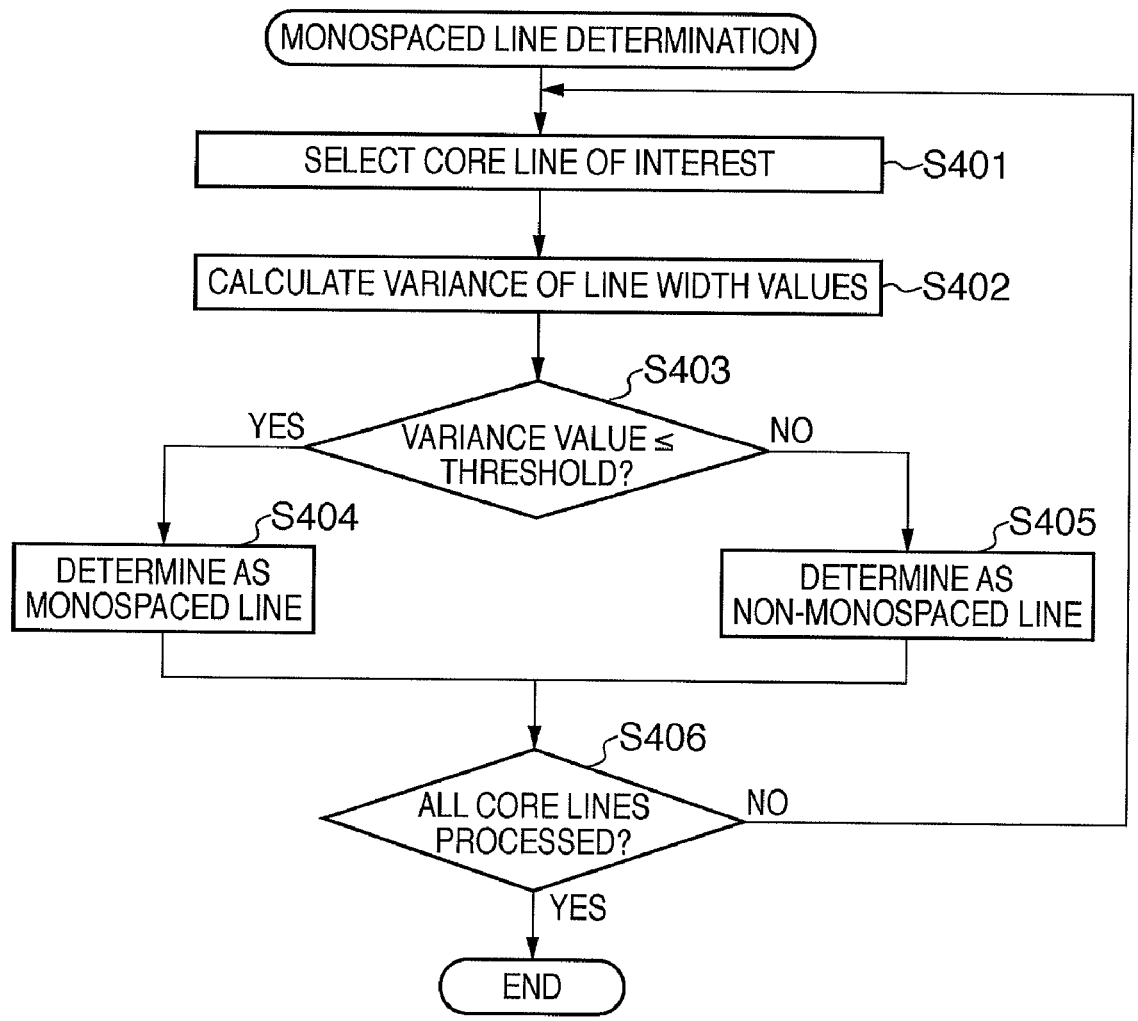
FIG. 9 is a flowchart showing a monospaced line determination process.

It is determined in step S400 whether or not each of the core lines divided in step S300 is a monospaced line. Whether or not each core line is a monospaced line is determined by calculating the variance of the line width values calculated in step S200. FIG. 9 is a flowchart showing the monospaced line determination process.

A divided core line of interest is selected in step S401, and the variance of the line width values of the selected divided core line is calculated in step S402. A core line as a monospaced line tends to have a smaller variance value since the line width values at respective positions assume closer values. Conversely, a core line as a non-monospaced line tends to have a larger variance value since respective pixels have different line width values. As target pixels in the process for calculating the variance, either all the core line pixels or some sampled representative pixels may be used.

Whether or not the divided core line of interest is a monospaced line is determined in step S403 by comparing the calculated variance value with a threshold held in advance in the ROM 6. If the variance value is equal to or smaller than the threshold, a monospaced line is determined; otherwise, a non-monospaced line is determined. For example, a standard deviation calculated as the variance of an interval bd in FIG. 8 is 0.445, and that of an interval cd in FIG. 8 is 2.095. If the threshold=1.0, the interval bd can be determined as a monospaced line, and the interval cd can be determined as a non-monospaced line. This threshold can be changed according to information of, for example, the length of a core line to be determined. If it is determined that the divided core line of interest is a monospaced line, information indicating that the divided core line of interest is determined as a monospaced line is appended to the divided core line of interest in step S404. On the other hand, if it is determined that the divided core line of interest is not a monospaced line, information as a non-monospaced line is appended in step S405. It is confirmed in step S406 if all the divided core lines have been determined. If the divided core lines to be determined still remain, a divided core line of interest is updated in step S401 to restart the monospaced line determination process.

If only the variance of the line width values is used as a criterion of judgment in step S400, an appropriate variance value as the criterion of judgment cannot be obtained for a short interval like an interval ag in FIG. 8. As a result, this interval may be determined as a monospaced line, and a determination error may occur. In order to suppress such determination error, it is desired that a divided core line which has a length less than a given length is determined as a "non-monospaced line" even when the variance value is equal to or smaller than the threshold, and it is corrected to a monospaced line in the post-process if necessary. When the variances are calculated from the line width values of all pixels of core lines to have a variance threshold=1.0 and a length threshold=5, intervals bd, df, and of are finally determined as monospaced lines from the core line images in FIG. 8.

<Connection Relation Information Generation Process>

In step S500, connection relation information which allows reference to connected divided core lines at each intersection is generated. FIG. 10 shows an example of the connection relation information. From FIG. 10, intersection numbers, divided core lines connected to respective intersections, the number of divided core lines connected to each intersection, and the divided core lines as monospaced lines can be referred to. In this example, core lines having intersections at two ends are redundantly registered. FIG. 10 exemplifies only connection relation information associated with intersections, but it is desired to also hold connection relation information associated with end points.

<Core Line Modification Process>

In step S600, the core line is modified based on pieces of original line width information estimated for respective core line pixels in step S200 and pieces of connection relation information which is generated in step S500 and indicate how divided core lines are connected. The core line modification process includes a core line remove process for removing branch line noises, and a monospaced line division process for extracting only monospaced components from the core line.

In the core line remove process, all the non-monospaced lines are investigated to remove branch line noises such as intervals bi, bj, and fl in FIG. 8, which are generated by the thinning process. The following three conditions common to these divided core lines to be deleted are used:

(1) include an open edge
(2) connected to a monospaced line at an intersection
(3) line width values monotonically increase from an open edge toward an intersection By deleting divided core lines which satisfy all the above three conditions, branch line noises can be removed with higher precision than in a case in which only the length is used as a determination condition. Note that the open edge indicates an end point of a core line, which is not connected to another core line. Based on the conditions (1) and (2), a core line has an open edge at one end point, and is connected to another monospaced line at an intersection at the other end point.

Figure 11:
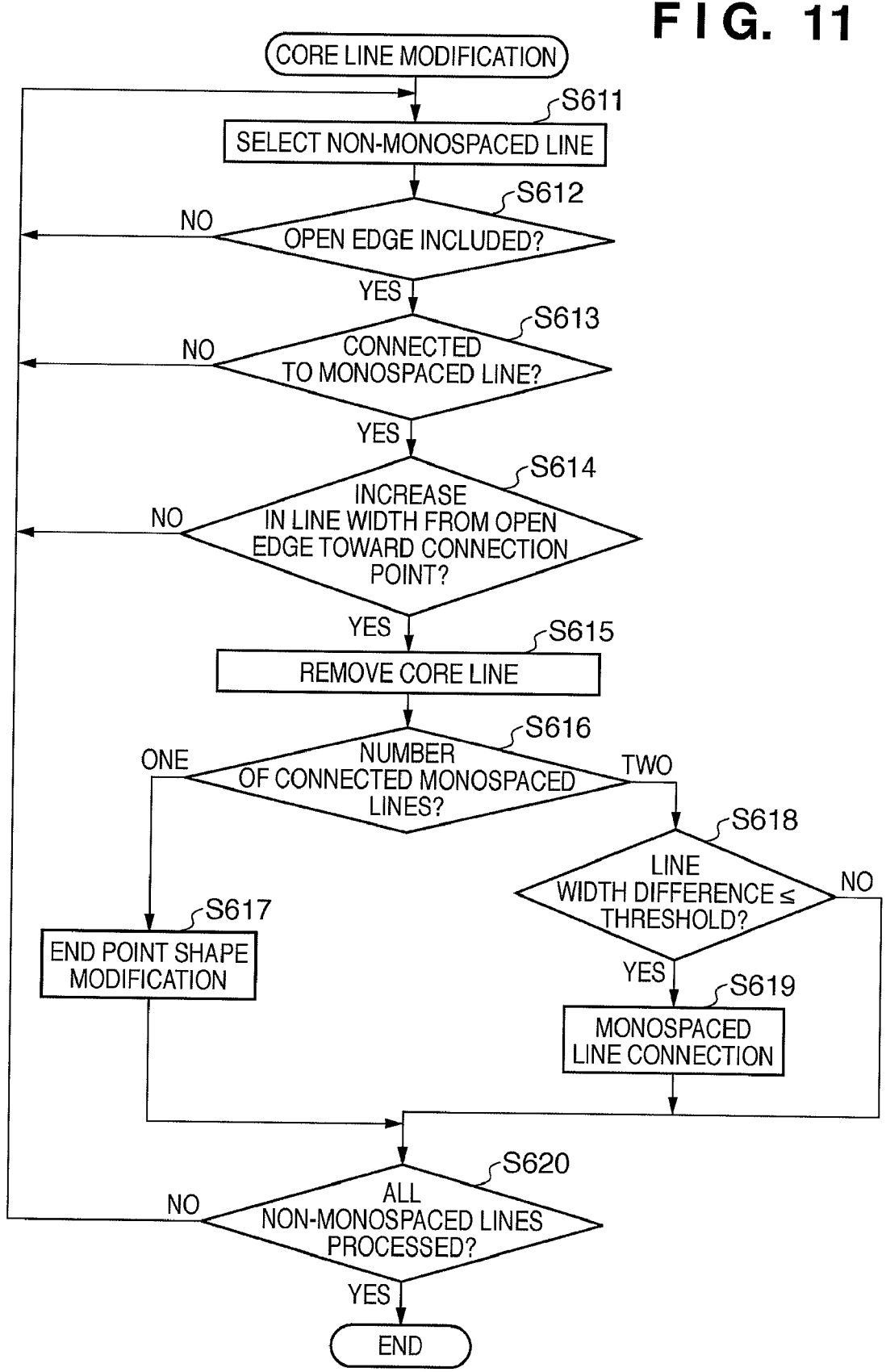
FIG. 11 is a flowchart showing a core line remove process.

FIG. 11 shows the sequence of the core line remove process. In step S611, a non-monospaced line of interest is selected. After that, it is determined in step S612 if the non-monospaced line of interest includes an open edge. If the non-monospaced line of interest does not include any open edge, the process returns to step S611 to select the next non-monospaced line and to restart the process. It is determined in step S613 if the non-monospaced line of interest is connected to a monospaced line at an intersection. If the non-monospaced line is not connected to any monospaced line, the process returns to step S611 to select the next non-monospaced line and to restart the process. It is determined in step S614 if the line width values monotonically increase from the open edge toward an intersection with another monospaced line. If the line width values monotonically increase, it is determined that the divided core line of interest is a branch line noise, and that divided core line is removed in step S615. If the line width values become smaller in the middle of the line, that is, they do not monotonically increase, it is determined that the non-monospaced line of interest is not a branch line noise, and the process returns to step S611 to select the next non-monospaced line and to restart the process. The core line remove process is executed for the core line image and connection relation information.

Taking FIG. 8 as an example, since the intervals bi, bj, and fl satisfy the above three conditions, they are determined as branch line noises and are removed. Intervals ag and ah do not satisfy the condition (2) since an interval ac is determined as a non-monospaced line, and are not determined as branch line noises. Hence, these intervals are not deleted. Also, since an interval ek does not satisfy the condition (2), it is not determined as a branch line noise and is not deleted. Note that the intervals ag and ah can be removed by executing the core line remove process again after the monospaced line division process in FIG. 11 to be described later is executed to divide a part of the interval ac as a monospaced line.

<Monospaced Line End Point Shape Modification Process>

By removing branch line noises, only core line components which express the feature of an original image can be extracted. However, when vectorization is applied to image data after the process of the present application, monospaced lines connected to removed branch line noises have to be modified to enhance original image reproducibility. The modification in this case indicates an end point shape modification process to be executed in step S617 or a monospaced line connection process to be executed in step S619.

Step S616 determines which modification process to execute, step S617 or step S619, based on whether one or two monospaced lines are connected to the removed branch line noises.

Figure 12:
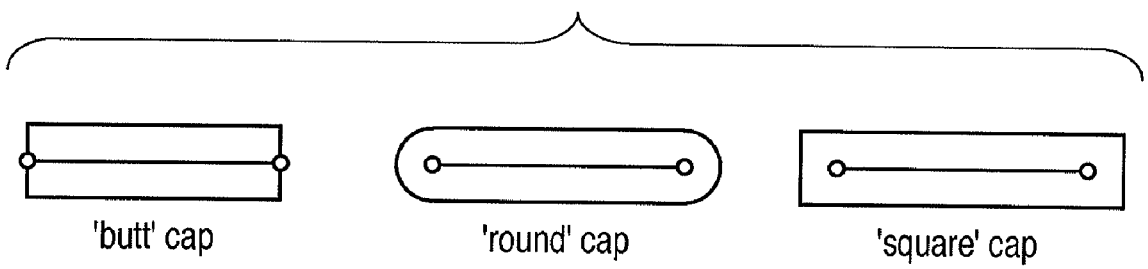
FIG. 12 is a view showing end point shape examples.

Step S617 is the end point shape modification process, and is executed when a removed branch line noise was connected to one monospaced line (that is, when a portion of a monospaced line to which a removed branch line noise was connected is left as an end point after the branch line noise was removed). This branch line noise is that generated at the end point like an intersection b in FIG. 8, and the original image reproducibility upon rendering vector data is enhanced by giving LINECAP information included in a vector format such as SVG (Scalable Vector Graphics). FIG. 12 shows some types of LINECAP information. Since the position of an end point of a core line obtained by executing the thinning process becomes a shorter position than the end point position of a monospaced line, square cap information is given to faithfully reproduce the input shape. When the square cap information is given, the line length is prolonged at the time of rendering. Also, the shape of the monospaced line end point can be modified by extending the end point of a monospaced line according to the line width. Also, when an end point has a round shape, round cap information is given to reproduce the end point to have the round shape.

<Monospaced Line Connection Process>

When a removed branch line noise was connected to two monospaced lines, the connection process of these two monospaced lines is executed. This process is executed to cope with a problem caused by a branch line noise generated at a corner point like an intersection f in FIG. 8. This problem will be described below taking FIG. 8 as an example. Intervals df and of originally form one monospaced line. However, when it is recognized that an intersection exists at a position of an intersection f due to a branch line noise as an interval fl, these intervals are divided at the intersection f, and are handled as two monospaced lines. In step S618, the line width difference between the two monospaced lines is compared with a threshold held in advance on the ROM 6, and if the line width difference is equal to or smaller than the threshold, it is determined that these two monospaced lines originally form one monospaced line, and the monospaced line connection process is executed in step S619. After the process in step S619, it is determined in step S620 if the core line modification process is complete for all non-monospaced lines, if the core line modification process is not complete yet, the process returns to step S611 to select the next non-monospaced line of interest and to continue the process. If it is determined in step S618 that the line width difference is larger than the threshold, the process advances to step S620.

That is, the monospaced line connection process executed in step S619 is a process for applying the connection process to two monospaced lines which are cut by the core line remove process although they originally form one monospaced line. That is, this process integrates pieces of connection relation information of two divided core lines having a common intersection.

<Monospaced Line Division Process>

Next, the division process of a monospaced line interval is executed. The interval ac in FIG. 8 is determined as a non-monospaced line in the above monospaced line determination process. This results from monospaced and non-monospaced components mixed in a core line of interest upon dividing the core line based on the intersection and end point positions. Since the interval ac originally includes a monospaced component, it is desirably divided into a monospaced line and non-monospaced line in consideration of use in the post-process. Also, by extracting a monospaced component from the interval ac, branch line noises as intervals ag and ah, which could not be removed by the above core line remove process, can be removed.

Figure 13:
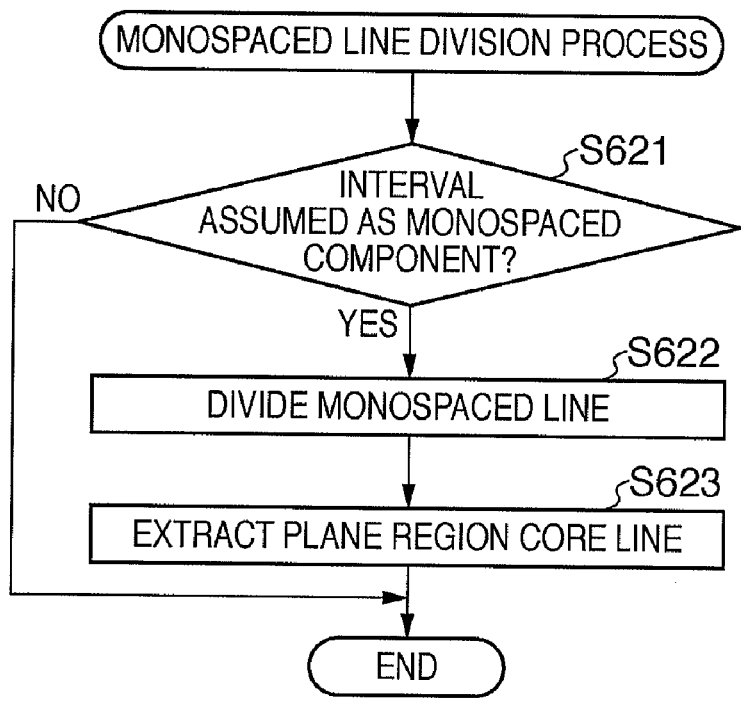
FIG. 13 is a flowchart showing a monospaced line division process.

FIG. 13 shows the sequence of the monospaced line division process. In step S621, a monospaced line determination process for determining if a certain interval can be assumed as a monospaced line is executed. If an interval assumed as a monospaced line is detected, a new division point is set, the interval determined as the monospaced line is divided in step S622, and an interval which is not determined as a monospaced line is extracted as a core line of a non-monospaced line in step S623. An interval assumed as a monospaced line may be set for all possible combinations of intersections and end points, or it may be arbitrarily set according to the magnitude of the estimated line width value at each intersection. For example, since the estimated line width value corresponding to an intersection c is "9", a value "5" obtained by multiplying the estimated line width value by ½ and rounding the first decimal place of the product is used as a parameter. Then, the interval ac is divided at a point m spaced apart by 5 pixels from the intersection c. After that, an interval am undergoes the monospaced line determination process, thus improving the discrimination precision of monospaced and non-monospaced lines.

Figure 14:
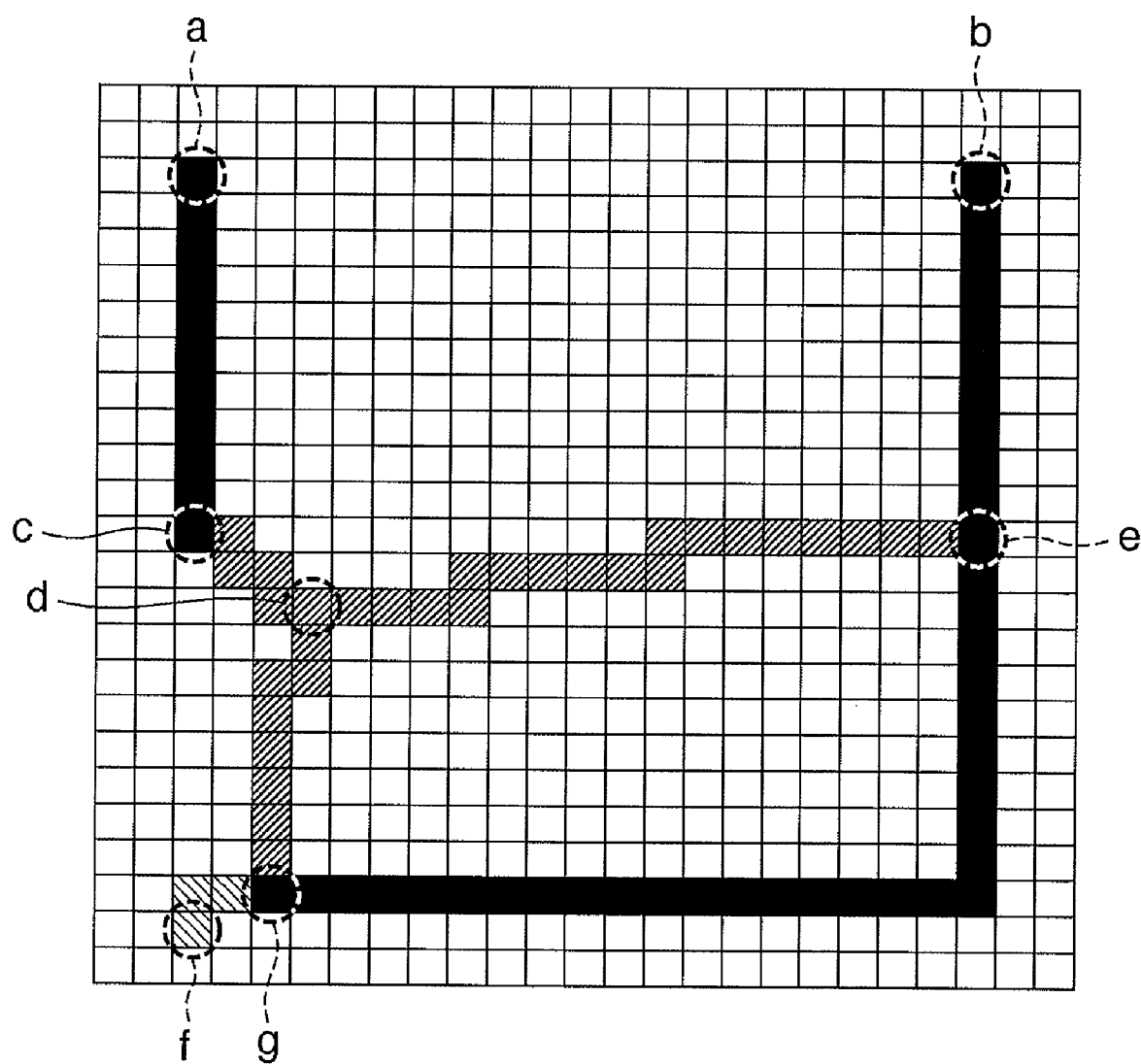
FIG. 14 is a view showing a process example of a core line modification process.

After execution of the monospaced line division process, even a divided core line which is initially determined as a non-monospaced line although it is a monospaced line can be re-divided and can be handled as a monospaced line. Hence, when the core line remove process is executed again after the monospaced line division process, branch line noises can be removed more precisely. When the core line remove process is applied again to the core line figure shown in FIG. 8 after the monospaced line division process, the results shown in FIGS. 14 and 15 can be obtained. In FIG. 14, black core lines represent monospaced lines, and gray core lines represent non-monospaced lines.

<Plane Region Core Line Extraction Process>

Since core lines extracted as non-monospaced lines indicate a plane region, the gray core lines in FIG. 14 indicate a plane region. In this manner, plane region core lines can also be extracted.

With the aforementioned processes, branch line noises and distortions of core lines, which are generated by the thinning process and do not express the feature of an image, can be precisely modified, and a core line image that faithfully express the feature of an original image can be generated. As a result, a thinning image which is easy to use in the post-process can be obtained. For example, when a vectorization process is executed as the post-process, core lines of intervals of monospaced lines are converted into vector data, and are held together with line width information, thus reproducing the intervals of the monospaced lines as vector data (a combination of core line vector data and line width information). When such core lines are expressed as vector data, an edit process such as a line width change process can be easily executed. As for intervals of non-monospaced lines, edges are extracted from only a partial image corresponding to the non-monospaced lines as a processing target in a binary image, and undergo the vectorization process, thus generating vector data of a plane portion. That is, the vectorization process methods can be easily switched between a monospaced line portion and non-monospaced line portion.

<Second Embodiment>

In the first embodiment, the thinning process in step S100 in FIG. 1 is executed to the end so that all figure pixels have a 1-pixel width. Alternatively, the thinning process is interrupted halfway, and only a core line portion for which the thinning process is complete is extracted to execute subsequent processes. Whether or not the thinning process is complete can be determined by seeing if eight neighboring pixels around a pixel of interest have changed from those at the time of the previous raster scan.

When the thinning process is interrupted halfway, a new intersection is generated between a core line for which the thinning process is complete and a thinning incomplete region. In steps S500 and S600 in FIG. 1, the connection relation at each intersection is referred to. However, when the thinning process is interrupted halfway, it is interpreted that an intersection which contacts the thinning incomplete region is connected to a non-monospaced line, and the subsequent processes are executed.

As described above, even when respective processes are not applied to all pixels, the control can advance to the next process. Then, general versatility at the time of use in the post-process can be improved.

Other Embodiments

Aspects of the present invention can also be realized by a computer of a system or apparatus (or devices 7 such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-000388, filed Jan. 5, 2009, which is hereby incorporated by reference herein in its entirety.

What is claimed is:

1. An image processing apparatus comprising:
   a thinning process unit which extracts a core line by applying a thinning process to an input image;
   a line width estimation unit which estimates an original line width of each pixel of the core line extracted by said thinning process unit;
   a core line division unit which divides the core line extracted by said thinning process unit at an intersection;
   a monospaced line determination unit which determines, based on line width information estimated by said line width estimation unit, whether or not each of core lines divided by said core line division unit is a monospaced line;
   a connection relation information generation unit which generates connection relation information with another core line in association with each of the core lines divided by said core line division unit; and
   a core line modification unit which modifies the core lines divided by said core line division unit, based on pieces of line width information of core line pixels estimated by said line width estimation unit, a monospaced line determination result by said monospaced line determination unit, and pieces of connection relation information generated by said connection relation information generation unit.

2. The apparatus according to claim 1, wherein said core line modification unit includes a core line remove unit which determines whether or not a core line which is determined not as a monospaced line by said monospaced line determination unit satisfies a condition indicating that one end point of that core line is an open edge, a condition indicating that the other end point is connected to another monospaced line, and a condition indicating that line widths estimated by said line width estimation unit monotonically increase from the open edge to an intersection with the another monospaced line, and removes the core line which is determined to satisfy the conditions.

3. The apparatus according to claim 2, wherein said core line remove unit includes a monospaced line end point shape modification unit which modifies, when the core line which is determined to satisfy the conditions is removed and when the removed core line is connected to one monospaced line, an end point shape of that monospaced line.

4. The apparatus according to claim 2, wherein said core line remove unit includes a monospaced line connection unit which connects, when the core line which is determined to satisfy the conditions is removed, when the removed core line is connected to an intersection with two monospaced lines, and when a line width value difference is not more than a threshold between the two monospaced lines connected to the intersection, the two monospaced lines.

5. The apparatus according to claim 2, wherein said core line modification unit includes a monospaced line division unit which determines whether or not a core line which is determined not as a monospaced line by said monospaced line determination unit includes an interval assumed as a monospaced component and divides, when the core line includes the interval assumed as the monospaced component, the interval assumed as the monospaced component as a monospaced line.

6. The apparatus according to claim 5, wherein said monospaced line division unit extracts an interval of the core line which is not divided as the monospaced line as a core line which represents a plane region.

7. The apparatus according to claim 5, wherein said core line modification unit removes a core line which satisfies the conditions using said core line remove unit after said core line modification unit divides the interval assumed as the monospaced component as a monospaced line by said monospaced line division unit.

8. The apparatus according to claim 1, wherein said connection relation information generation unit generates the connection relation information including a monospaced line determination result by said monospaced line determination unit, and
   said core line modification unit modifies the core lines divided by said core line division unit, based on pieces of line width information of core line pixels estimated by said line width estimation unit and pieces of connection relation information generated by said connection relation information generation unit.

9. An image processing method comprising:
   a thinning process step of controlling a thinning process unit of an image processing apparatus to extract a core line by applying a thinning process to an input image;
   a line width estimation step of controlling a line width estimation unit of the image processing apparatus to estimate an original line width of each pixel of the core line extracted in the thinning process step;

a core line division step of controlling a core line division unit of the image processing apparatus to divide the core line extracted in the thinning process step at an intersection;

a monospaced line determination step of controlling a monospaced line determination unit of the image processing apparatus to determine, based on line width information estimated in the line width estimation step, whether or not each of core lines divided in the core line division step is a monospaced line;

a connection relation information generation step of controlling a connection relation information generation unit of the image processing apparatus to generate connection relation information with another core line in association with each of the core lines divided in the core line division step; and a core line modification step of controlling a core line modification unit of the image processing apparatus to modify the core lines divided in the core line division step, based on the core line, pieces of line width information of core line pixels estimated in the line width estimation step, a monospaced line determination result in the monospaced line determination step, and pieces of connection relation information generated in the connection relation information generation step.

10. A non-transitory computer readable medium storing a computer program for making a computer function as:

a thinning process unit which extracts a core line by applying a thinning process to an input image;

a line width estimation unit which estimates an original line width of each pixel of the core line extracted by said thinning process unit;

a core line division unit which divides the core line extracted by said thinning process unit at an intersection;

a monospaced line determination unit which determines, based on line width information estimated by said line width estimation unit, whether or not each of core lines divided by said core line division unit is a monospaced line;

a connection relation information generation unit which generates connection relation information with another core line in association with each of the core lines divided by said core line division unit; and a core line modification unit which modifies the core lines divided by said core line division unit, based on pieces of line width information of core line pixels estimated by said line width estimation unit, a monospaced line determination result by said monospaced line determination unit, and pieces of connection relation information generated by said connection relation information generation unit.

* * * * *